(12) United States Patent
Segers et al.

(10) Patent No.: US 7,421,371 B2
(45) Date of Patent: Sep. 2, 2008

(54) AUTOMATED PERFORMANCE ANALYSIS AND FAILURE REMEDIATION

(75) Inventors: Erwin J. M. Segers, Venlo (NL); Anita C. Morskate, Venlo (NL); Lu Wang, Eindhoven (NL)

(73) Assignee: Oce-Technologies B.V., Venlo (NL)

( * ) Notice: Subject to any disclaimer, the term of this patent is extended or adjusted under 35 U.S.C. 154(b) by 99 days.

(21) Appl. No.: 11/338,687

(22) Filed: Jan. 25, 2006

(65) Prior Publication Data
US 2006/0168475 A1 Jul. 27, 2006

(30) Foreign Application Priority Data
Jan. 26, 2005 (EP) ................... 05100482
Oct. 4, 2005 (EP) ................... 05109199

(51) Int. Cl.
*G06F 17/00* (2006.01)
*G06F 17/40* (2006.01)

(52) U.S. Cl. .............. 702/183; 702/185; 702/187
(58) Field of Classification Search ........ 702/183, 702/184, 185, 187
See application file for complete search history.

(56) References Cited

U.S. PATENT DOCUMENTS

| | | | | |
|---|---|---|---|---|
| 5,132,920 A * | 7/1992 | Bellows et al. | ............... | 702/184 |
| 5,608,643 A | 3/1997 | Wichter et al. | | |
| 6,574,537 B2 * | 6/2003 | Kipersztok et al. | ............ | 701/29 |
| 6,691,064 B2 * | 2/2004 | Vroman | ...................... | 702/183 |
| 6,751,536 B1 * | 6/2004 | Kipersztok et al. | ............ | 701/29 |
| 7,013,239 B2 * | 3/2006 | Hedlund et al. | ............. | 702/182 |
| 2005/0187838 A1 * | 8/2005 | Squeglia et al. | ............... | 705/29 |
| 2006/0161819 A1 * | 7/2006 | Nissan-Messing et al. | .... | 714/48 |

FOREIGN PATENT DOCUMENTS

| | | |
|---|---|---|
| EP | 0 599 606 A2 | 6/1994 |
| EP | 1 109 101 A2 | 6/2001 |
| WO | WO-2004/051520 A2 | 6/2004 |

\* cited by examiner

*Primary Examiner*—Hal D Wachsman
(74) *Attorney, Agent, or Firm*—Birch, Stewart, Kolasch & Birch, LLP

(57) ABSTRACT

A service diagnosis tool for performance analysis and failure remediation of electromechanical devices, e.g. printers or copiers. The tool communicates with an actual device of a specific type, and accesses data from a knowledge data set containing knowledge relating to properties of devices of the specific type, a device data set and a history data set. The device data set contains parameters of the actual device, including actual error data indicating errors that occurred in an actual period. The historical data includes historical error data of the actual device relating to errors, performance and/or remediation that occurred before the actual period. The tool has a calculation unit for analyzing and combining data from the data sets for generating a prioritized item list indicative of remedial steps to be executed. The items in the list relate to performance and/or failure of the actual device, and are organized according to priority rules.

28 Claims, 6 Drawing Sheets

| Prioritized items | Action |
|---|---|
| Errors<br>.. error 234<br>.. error 567<br>... | Analyse and remediate |
| Quality<br>.. parameter123<br>.. level456<br>... | Test and verify |
| Preventive Maintenance<br>.. replace unit 987<br>.. clean section 876<br>.. check and refill level 543<br>... | Perform / replace |
| Other Symptoms<br>.. request 345<br>.. unknown symptom<br>... | Diagnose and act |
| Modifications<br>.. replace unit 765<br>.. load firmware v5.4<br>.. | Modify |

Fig. 6

AUTOMATED PERFORMANCE ANALYSIS AND FAILURE REMEDIATION

CROSS-REFERENCE TO RELATED APPLICATIONS

This nonprovisional application claims priority under 35 U.S.C. § 119(a) on Patent Application Nos. 05100482.8 and 05109199.9, filed in the European Patent Office on Jan. 26, 2005 and Oct. 4, 2005, respectively. The entirety of each of the above-identified applications is incorporated herein by reference.

BACKGROUND OF THE INVENTION

1. Field of the Invention

The invention relates to a system for diagnosis of electromechanical devices of at least one predefined type, the system including a communication unit that communicates with an actual device of the predefined type. More particularly, the system of the invention is for use as a performance analysis and failure remediation tool.

The invention further relates to a method for performance analysis and failure remediation of electromechanical devices of at least one predefined type, the method including the step of communicating with an actual device of the predefined type.

2. Description of Background Art

A system and method for failure prediction, diagnosis and remediation using data acquisition and feedback for a distributed electronic system is known from EP 1109101. In the system, real-time failure prediction and diagnoses of electronic devices operating in a network environment can be achieved by using monitoring data, feedback data, and pooling of failure data from a plurality of devices, e.g. electromechanical devices or machines like printers or copiers. First, a diagnostic system requests data on the state of a machine and/or its components and collections thereof as part of the machine's normal operation. Secondly, real-time processing of the data either at the machine site or elsewhere in the distributed network allows for predicting or diagnosing system failures. Having determined and/or predicted a system failure, a communication to one or more remote observers in the network allows the remote observers to view the diagnostic information and/or required action to repair the failure. Furthermore, interrogation of either the particular electronic device, or a database containing data on devices of a similar type, by the diagnostic server, allows the diagnostic server to refine original diagnoses based on this population data to achieve a comprehensive failure predication/diagnosing system. However, the diagnosis and remediation requires real-time processing, and is based on triggering by actual failures.

SUMMARY OF THE INVENTION

It is an object of an embodiment of the invention to provide a system and method for performance analysis and failure remediation that facilitates an integrated approach for increasing the performance and decreasing the amount of service and maintenance activities.

According to a first aspect of the invention the object is achieved by a system including a unit that accesses a knowledge data set containing knowledge relating to properties of devices of the predefined type, a unit that accesses a device data set containing parameters of the actual device, the parameters including actual error data indicating errors that occurred in an actual period, a unit that accesses a history data set containing historical data of the actual device, the historical data including historical error data relating to errors, performance data relating to performance analysis and/or remediation data relating to failure remediation that occurred before the actual period, and a calculation unit that analyzes and combines data from the data sets for generating a prioritized item list indicative of remedial steps to be executed, the items relating to performance and/or failure of the actual device, and being prioritized according to priority rules.

According to a second aspect of the invention the object is achieved with a method as described in the opening paragraph, the method comprising the steps of accessing a knowledge data set containing knowledge relating to properties of devices of the predefined type, accessing a device data set containing parameters of the actual device, the parameters including actual error data indicating errors that occurred in an actual period, accessing a history data set containing historical data of the actual device, the historical data including historical error data relating to errors, performance data relating to performance analysis and/or remediation data relating to failure remediation that occurred before the actual period, and analyzing and combining data from the data sets for generating a prioritized item list indicative of remedial steps to be executed, the items relating to performance and/or failure of the actual device, and being prioritized by applying priority rules.

According to a third aspect of the invention the object is achieved with a computer program product for performing the method.

According to a fourth aspect of the invention the object is achieved with a device of a predefined type of electromechanical devices, the device comprising the diagnosis system.

The measures have the following effect. Data from the knowledge data set contains knowledge relating to properties of devices of the predefined type. Data from the device data set is accessed for retrieving parameters of the actual device, in particular actual error data indicating errors that occurred in an actual period. The actual period is a time interval for performance measurement, e.g. since the last remedial session or a maintenance action (e.g. a visit of the service technician). In addition, the historical data of the actual device is retrieved, which includes historical error data relating to errors, performance data relating to performance analysis and/or remediation data relating to failure remediation that occurred before the actual period. Subsequently, the prioritized item list is generated by analyzing and combining data from the data sets, in which list items such as error data, maintenance issue, customer requests, updates, etc are filtered and organized according to their relative importance. The prioritized item list has the advantage that remedial steps to be executed are clearly identified, and their relative importance is recognizable. The items on the prioritized item list are prioritized according to priority rules, and relate to performance, maintenance and/or failure of the actual device. Hence service activities like failure analysis, error remediation and maintenance are effectively integrated, controlled and improved based on the prioritized item list.

In an embodiment of the system, the calculation unit is arranged for generating the prioritized item list according to the priority rules by including symptoms and corresponding actions, the symptoms being selected according to a level of affecting the performance of the actual device. By organizing the symptoms according to the level that they affect the operation of the device, an effective priority is achieved for remedial steps. This has the advantage that actions corresponding to the symptoms are rated according to the relevance for the performance of the device.

In an embodiment of the system, the calculation device comprises, for said analyzing, a systematic error analysis unit that systematically detects trends or patterns in the error data. This has the advantage that the systematic error analysis provides a user with a tool to analyze errors automatically and objectively, preventing human influences.

In an embodiment of the system, the systematic error analysis unit is arranged for detecting at least one trend of the actual device by comparing relative error values calculated from the actual and historical error data, and the calculation unit is arranged for including a trend item in the prioritized item list when the trend exceeds a predetermined threshold. Relative error values are error values with respect to the amount of operation of the device, e.g. a number of copies made divided by the absolute number of errors. This has the advantage that a performance analysis is based on the history, and actual error data, of the particular machine.

In an embodiment of the system, the systematic error analysis unit is arranged for detecting at least one pattern of the actual device based on relative error values calculated from at least the actual error data compared to at least one reference value based on the knowledge relating to properties of devices of the predefined type, and the calculation device is arranged for including a pattern item in the prioritized item list when the pattern exceeds a predetermined threshold. This has the advantage that a performance analysis is based on comparing actual values of the particular machine to expected levels calculated over a population of machines.

In an embodiment of the system, the calculation unit is arranged for setting the priority of an item in the prioritized item list according to priority rules by combining, for a selected error type, said detected trend and said detected pattern. This has the advantage that the relevance of the symptoms related to the selected error type is based on the detected trend from the actual machine and on comparing the occurrence to expected levels calculated over a population of machines In an embodiment of the system, the calculation unit is arranged for including remedial data in the prioritized item list related to the remedial steps that have been executed. This has the advantage that actions performed are coupled to the symptoms that have been detected.

In an embodiment of the system, the unit that accesses the history data set is arranged for including the prioritized item list in the history database. This has the advantage that the prioritized item list including status, detected errors, symptoms, etc. that has been generated at earlier remedial sessions can be retrieved from the history database.

In an embodiment, the diagnosis system is included in the control software of the electromechanical device and may be activated by an operator, e.g. a service technician. In a more specific embodiment, the device comprises an interface (e.g., a connection slot) for a portable data storage medium, such as a USB memory stick, including service data for devices of the relevant type. This may be so configured that the diagnosis system is automatically started up when the portable data storage medium is connected to the device. Additionally, the portable data storage medium may contain authorization data, which authorize access to the service diagnosis system, so as to prevent misuse.

After the service session has been completed, report data may be stored in the portable storage medium for analysis and/or processing at a later stage.

The use of a portable data storage medium as described above is not limited to the specific diagnosis system as described in this patent application, but may apply to any kind of diagnosis systems for electromechanical devices such as printers or scanners.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein:

FIG. 6 shows a prioritized item list.

DETAILED DESCRIPTION OF THE PREFERRED EMBODIMENTS

Figure 1:
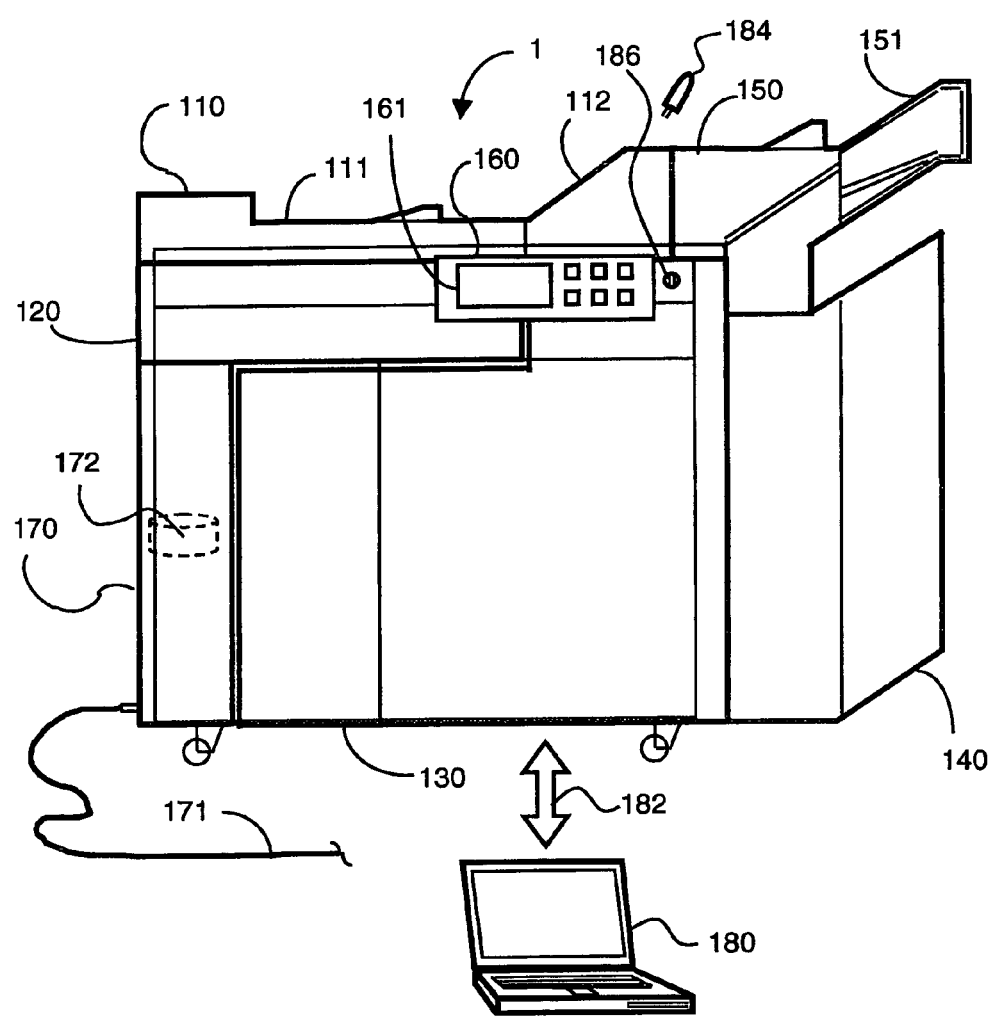
FIG. 1 shows an apparatus for processing sheets.

The Figures are diagrammatic and not drawn to scale. In the Figures, elements which correspond to elements already described have the same reference numerals.

FIG. 1 shows an apparatus for processing sheets. The sheets are usually paper documents, but may include any type of sheets for carrying information, e.g. overhead sheets, books, drawings, etc.

The apparatus 1 has a printer unit 130 which includes an electro-photographic processing section known per se, in which a photoconductive medium is charged, exposed (e.g. via an LED array) in accordance with digital image data. The medium is developed with toner powder, and thereafter the toner image is transferred and fixed on an image support, usually a sheet of paper. Alternatively the image may be generated by ink, wax, etc. A stock of image supports in different formats and orientations is available in a supply section 140. The image supports with the toner image are transported to the finishing and delivery section 150, which if necessary collects them into sets and staples them and then deposits them in the delivery tray 151.

The apparatus for processing sheets may be a printer only, but preferably is a multi-functional device further including scanning, copying or faxing functions, e.g. a versatile copier. A document feeder 110 is provided with an input tray 111 for the introduction of a stack of documents, a transport mechanism (not shown) for transporting the documents one by one along a scanner unit 120, and a delivery tray 112, in which the documents are placed after scanning. The scanner unit 120 includes a flat bed scanner provided with a glass platen on which an original document can be placed, a CCD array and an imaging unit having a movable mirror and lens system for imaging the document on the CCD array. In these conditions, the CCD array generates electrical signals which are converted into digital image data in a manner known per se. The apparatus has a user interface, for example including an operator control panel 160 provided on the apparatus for operation thereof. The user interface may be provided with a display 161 and keys.

The control unit of the apparatus is shown diagrammatically by reference 170. A cable 171 may connect the control unit 170 via a network unit to a local network. The network may be wired, but may also be partly or completely wireless. The apparatus may be coupled to a service tool, e.g. a computer program in a portable computer 180, via the network, via a dedicated connector or via a wireless connection 182. The service tool is provided with a communication unit for communicating with an actual device under test. The service device may be for servicing devices of various types, and may be implemented by a standard computer, e.g. a laptop, in combination with a software program, and, if necessary, some additional interface hardware for communicating with the device under test.

For operating with the service tool, the apparatus is provided with a non volatile memory, e.g. a magnetic hard disk 172, for containing status information of the apparatus, called a device data set. The memory is managed by the control unit 170. The device data set contains actual parameters of the device, the parameters including actual error data indicating errors that occurred in an actual period. The actual period is a time interval for performance measurement, e.g. since the last remedial session or maintenance action of a user (e.g. a service technician). The actual period is usually reset manually by the user, but may be controlled automatically. A predefined device test is used for the manual reset. The presentation of data within the actual interval can be based on a fixed period in time (e.g. each month is measured separately), or may be linked to an amount of operations (e.g. operational hours, or number of copies). The error data may include a number of different error codes, or dedicated error counters, or a series of measured values for specific parameters or errors.

In an embodiment of the apparatus, the control unit 170 is further provided with a history data set unit for managing a history data set containing historical data of the device. The history data may also be stored in the non volatile memory, or in a separate memory, e.g. a floppy disk. The historical data may include historical error data relating to errors, performance data relating to performance analysis and/or remediation data relating to failure remediation that occurred before the actual period.

Figure 2:
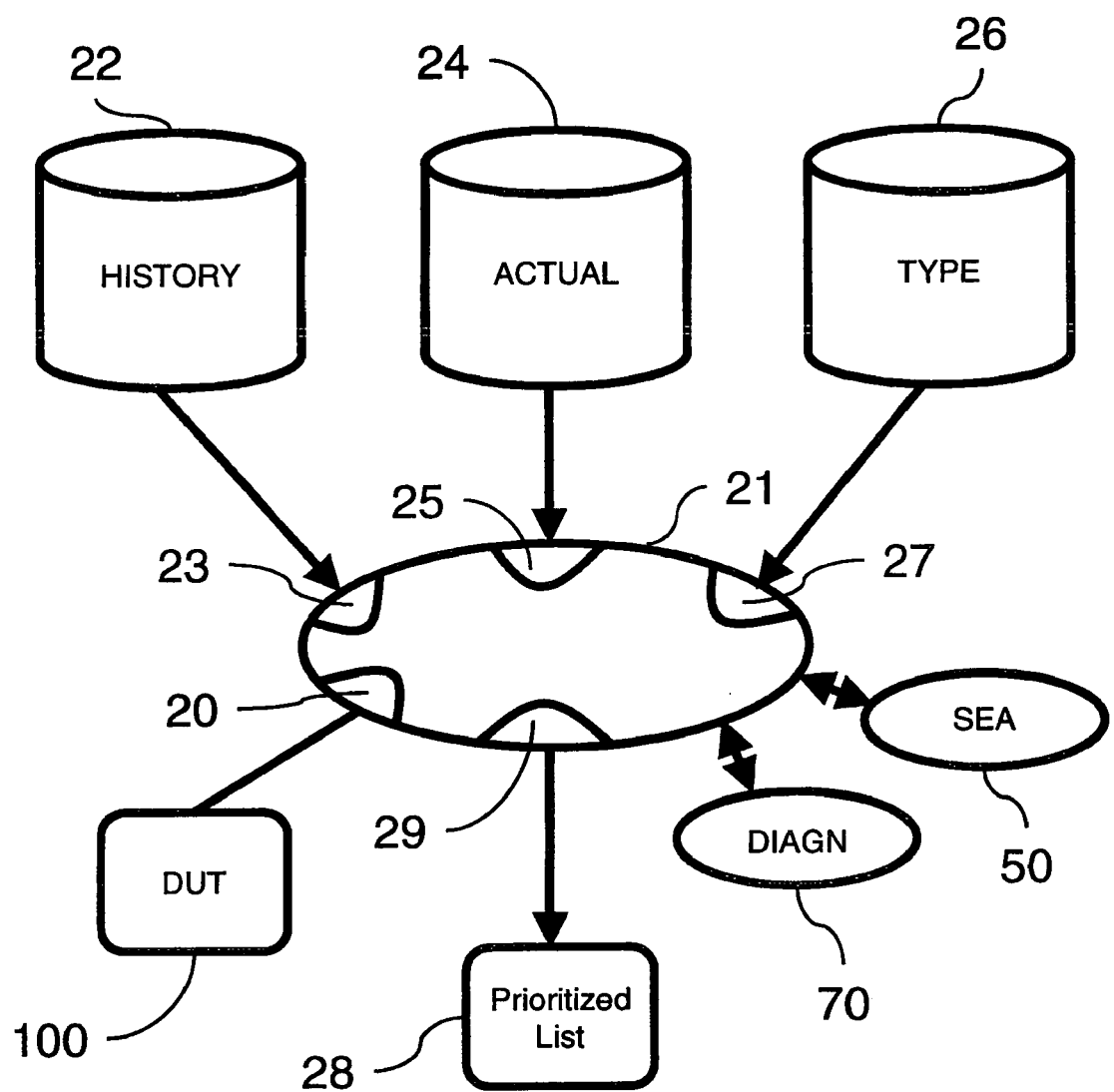
FIG. 2 shows a system for performance analysis and failure remediation.

FIG. 2 shows a system for performance analysis and failure remediation. The Figure is a diagrammatic representation of the system for performance analysis and failure remediation of electromechanical devices of at least one predefined type. The system has a service tool 21, for example a dedicated hardware unit or software tool embedded in a portable computer 180 or in a remote processor linked via a network. The service tool 21 operates a communication unit 20 for communicating with an actual device 100 (Device Under Test) of the predefined type, for example a network or dedicated interface unit for connecting to the sheet processing apparatus shown in FIG. 1. The service tool 21 has a first access unit 27 for accessing a knowledge data set 26 relating to the type of the device, a second access unit 25 for accessing the device data set 24 and a third access unit 23 for accessing the history data set 22, the latter two data sets relating to the particular device under test 100. Further, the service tool 21 has a calculation unit 29 for analyzing and combining data from the data sets for generating a prioritized item list 28 indicative of remedial steps to be executed, the items relating to performance and/or failure of the actual device, and being prioritized according to priority rules. The service tool may be provided with a user interface and operator entry functions for entering the operations performed, e.g. an entry unit applying a keyboard, mouse and display.

Finally, the service tool includes modules for systematic error analysis 50 and for automated diagnostic test procedures 70, that will be further described hereinbelow.

The prioritized item list 28 includes an integrated set of items to be attended or performed, relating to errors that occurred in an actual period, namely, a time interval for performance measurement, e.g. since the last remedial session or a maintenance visit of a service technician. In addition, the prioritized item list includes maintenance items, which may be linked to an amount of operational use retrieved from the device. A high priority may be assigned to maintenance items that are overdue, or will be so shortly.

In practice, in the service tool, maintenance and performance analysis is aligned with service organization rules. The service organization may be focused on a 'quality visit'. This means in practice a focus on lower Mean Time To Repair (MTTR), and performing preventive maintenance when time is available. The requirements of the service organization are translated into priority rules for the performance analysis. The priority rules are included in the service tool 21.

In an embodiment of the service tool 21, the calculation unit 29 sets the priority of an item in the prioritized item list 28, for a selected error type, in dependence on a number of activities that has been executed by the electromechanical device in the actual period. In general, the values presented for errors may be normalized based on the operational use, e.g. the number of errors per 10,000 copies. Also, the use of consumables such as toner may be presented as a relative number. The priority of the item may subsequently be based on the relative values.

For example, the relative performance value may be determined as follows. Suppose an error code is generated in a copier machine when an original document sheet is not separated in time. The error code is related to operation of the separation mechanism and a relative performance value can be calculated. If the error code occurred 10 times and the separation mechanism was used 10000 times, the relative performance value is 10000 divided by 10=1000. Obviously, a high relative performance value represents a better functionality of the device than a low value.

The prioritized item list may further include upgrading options, e.g. new software to be installed or hardware items to be exchanged when available. The prioritized item list may also include items to be performed on request of the customer, e.g. new functions to be added, or items which require special attention included at an earlier stage, e.g. by a service technician at an earlier visit. The prioritized item list is organized by priority rules, which rules determine the presentation and/or location of an item in the list as discussed below.

It is noted that the knowledge data set 26 contains knowledge relating to properties of devices of one or more types, and may be implemented as a database in the portable computer, or as a remote database to be accessed via a network like the Internet. The relevant part of the knowledge database for a specific type of device is called a "type database". The type database may be filled and maintained by the manufacturer of the electro mechanical device, or by a service and maintenance department, based on knowledge gathered during the design and (prototype) testing of the device, and on field experience with other devices of the particular type.

Figure 3:
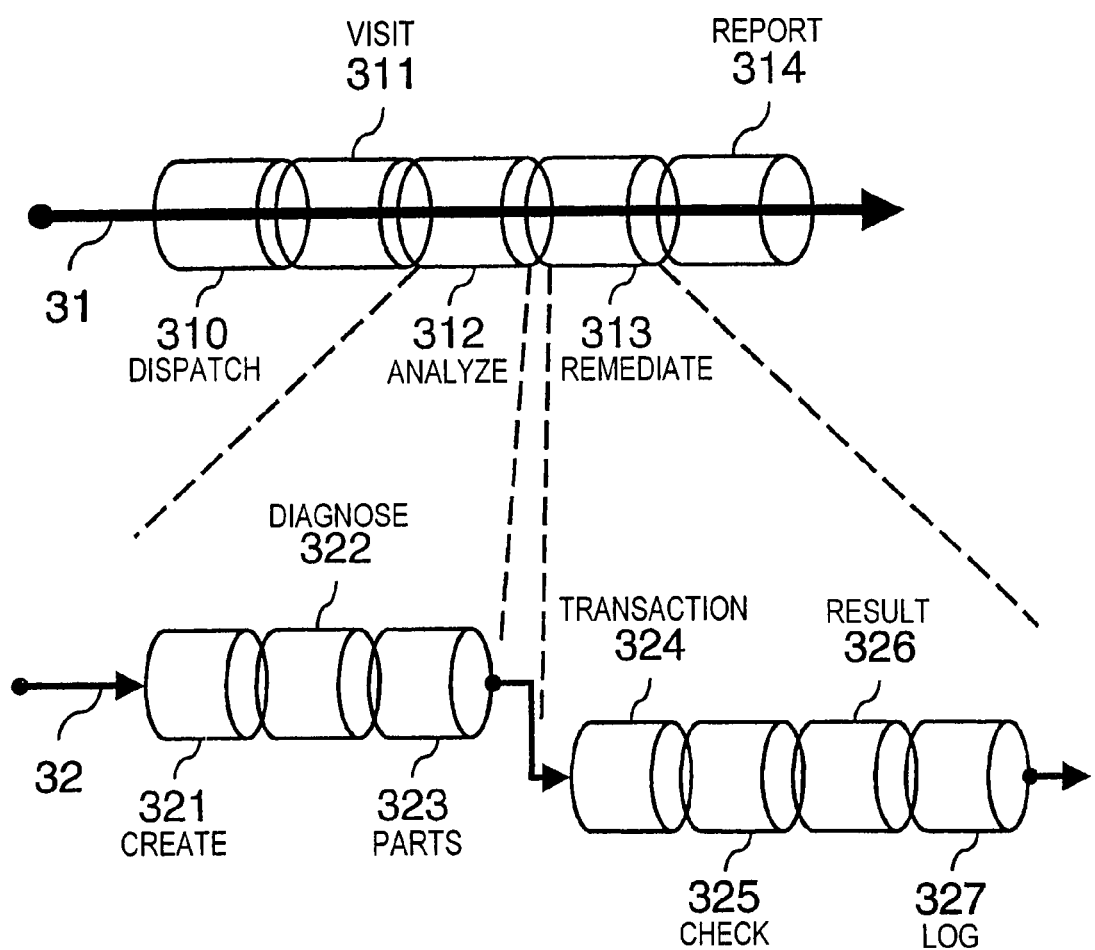
FIG. 3 shows a performance analysis and failure remediation method.

FIG. 3 shows a performance analysis and failure remediation method related to the present invention. An upper part shows a main process 31 for applying service and maintenance to a device that is deployed or owned by a customer. The first step DISPATCH 310 indicates the task preparation for a service job, and may include receiving a message from the device or from the customer that the device is not working properly, or needs maintenance. In the next step VISIT 311 a service tool is coupled to the actual device. In step ANALYSE 312, the status and activities are analyzed and diagnosed. Subsequently, in step REMEDIATE 313 the device is tested, repaired and/or maintenance is performed to remediate and prevent malfunction or disturbance of the performance of the device. Finally, in step REPORT 314, the service activities are reported to a central administrative unit, e.g. for including the performance analysis and failure remediation data in the knowledge of the type of devices, or for billing the customer.

In a lower part 32, FIG. 3 shows the steps ANALYSE 312 and REMEDIATE 313 in more detail, which steps are implemented and supported by embodiments of the service tool 21 as discussed above with reference to FIG. 2. In a first step CREATE 321, the service tool accesses the databases and creates the prioritized item list. In a further step DIAGNOSE 322, the service tool may perform a detailed diagnosis on selected items of the prioritized item list as discussed in detail below. In a step PARTS 323, the service tool indicates parts to be exchanged, cleaned or maintenance to be performed. The required parts may be checked against a stock that is available, e.g. a stock in the service technician's car. As a result, in step TRANSACTION 324, the service technician may fetch the required parts all at once, whereas missing parts may be ordered automatically. Further, the service technician may exchange the parts and perform the maintenance operations indicated on the prioritized item list. In a step CHECK 325, the repaired product is operated according to predefined test routines, e.g. dedicated tests or manual operations, to verify the correct operational status. In a step RESULT 326, the complaint of the client may be tested against the repaired product, to verify the result of the service session. In particular, the complaint may be part of the prioritized item list, and may be marked as remediated by the service tool. Finally, in step LOG 327 the service session is concluded by setting the device to a new actual period, e.g. by resetting counters for operational use. Finally, the result of the service session, called an "executed prioritized item list" which may include error data, parts exchanged, maintenance performed and results achieved, is included in the historical data set 22 of the actual device 100.

Figure 4:
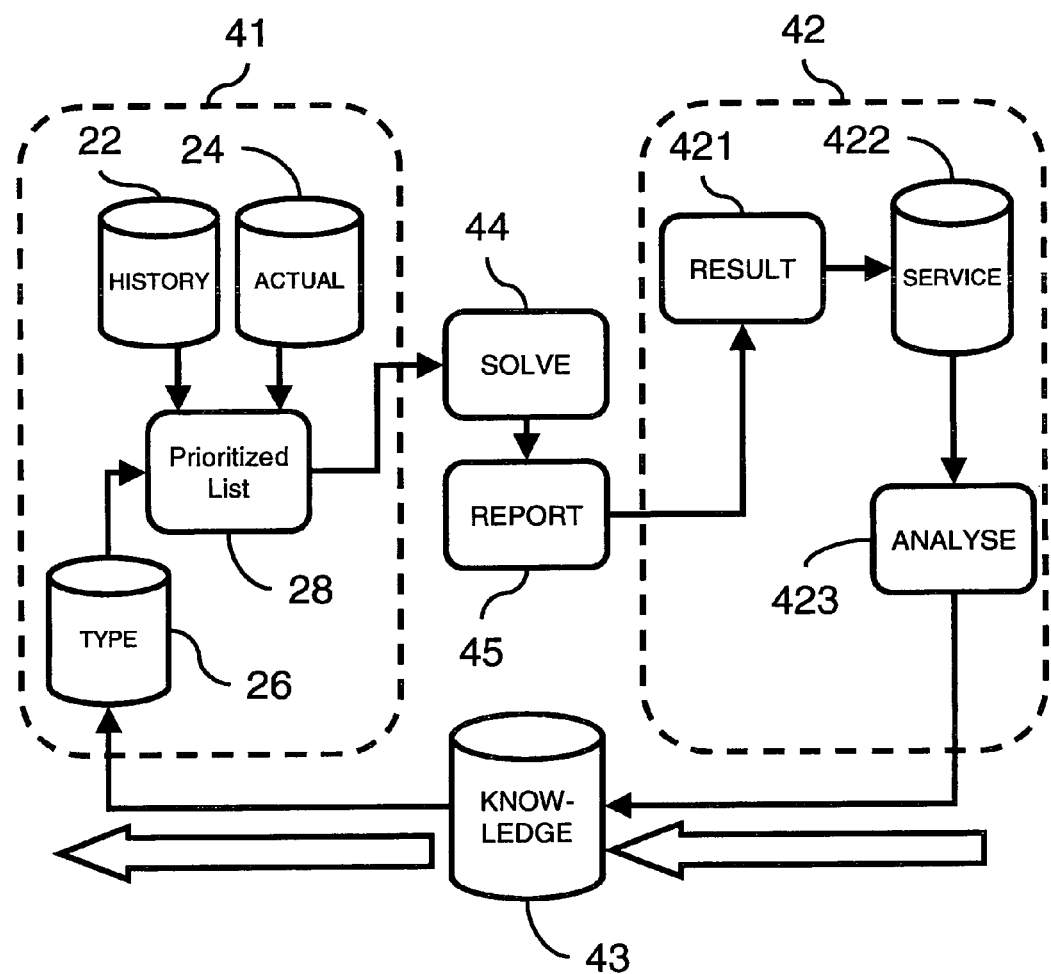
FIG. 4 shows a performance analysis and failure remediation method including knowledge creation.

FIG. 4 shows a performance analysis and failure remediation method including knowledge creation. A left section 41 shows the performance analysis and failure remediation system as discussed above. In a step SOLVE 44, service is applied according to the prioritized item list and existing problems are solved. In a step REPORT 45, the status of the device and maintenance is reported. A right section 42 shows a knowledge buildup function of a central service unit, e.g. a corporate service center of a manufacturer. In a first step RESULT 421, results of failure and remediation are received from the service tool by reporting the executed prioritized item list which includes the relevant status information and actions performed for service and maintenance. In a central service database 422, such historical data is gathered and organized. An analysis tool 423 operates on the central service database 422 for calculating average data and trends that are detected from the results of actual devices of a selected type according to the executed prioritized item list. The calculated data, representing average properties of the device of a selected type, are entered in a knowledge database 43. The knowledge database 43, or selected relevant data for specific devices, is transferred to the type database 26 to be accessed by the service tool 21, e.g. stored on a local hard disk. The transfer may be performed on a daily basis, for example overnight, when the service tool is connected to a local server. Data exchange between the computer of the service tool user 41 and the central server 42 (e.g. at the headquarters) may be done by means of the Internet, corporate intranet or dedicated connection, or by means of separate memories, e.g. CD ROMs. Alternatively, the knowledge database 43 may be accessed on demand to update the type database, e.g. via the Internet.

The system as described above with reference to FIG. 2 may include a systematic error analysis module 50 for executing systematic error analysis, which detects error patterns and trends as discussed below. The systematic error analysis module 50 may be implemented as a separate software tool interfacing with the service tool 21, or as an integrated part of the service tool. Functional details of the systematic error analysis module 50 will now be described.

Error patterns may be detected based on error codes for specific errors, or may be detected based on combining different error codes. A corresponding priority may be assigned based on the relative importance of the error pattern detected. For example a permanent error, which blocks the usage of the machine, will be assigned the highest priority. A warning message indicating possible or incidental errors may have a low priority. Error patterns may be compared to expected error values based on data from the type database.

Additionally, specific error levels may be compared to earlier error levels of the same error to detect trends, i.e. parameters compared to historical data of the same machine. In particular, a trend item may be included in the prioritized item list when the trend exceeds a predetermined threshold, i.e. the variation over time of a selected parameter is larger than the predetermined value for that parameter.

Error items may be displayed in the prioritized item list organized by assigning a priority reflecting the relative importance of the errors, i.e. the level of affecting the performance of the device, or a predicted remaining functional capacity based on trend.

Figure 5:
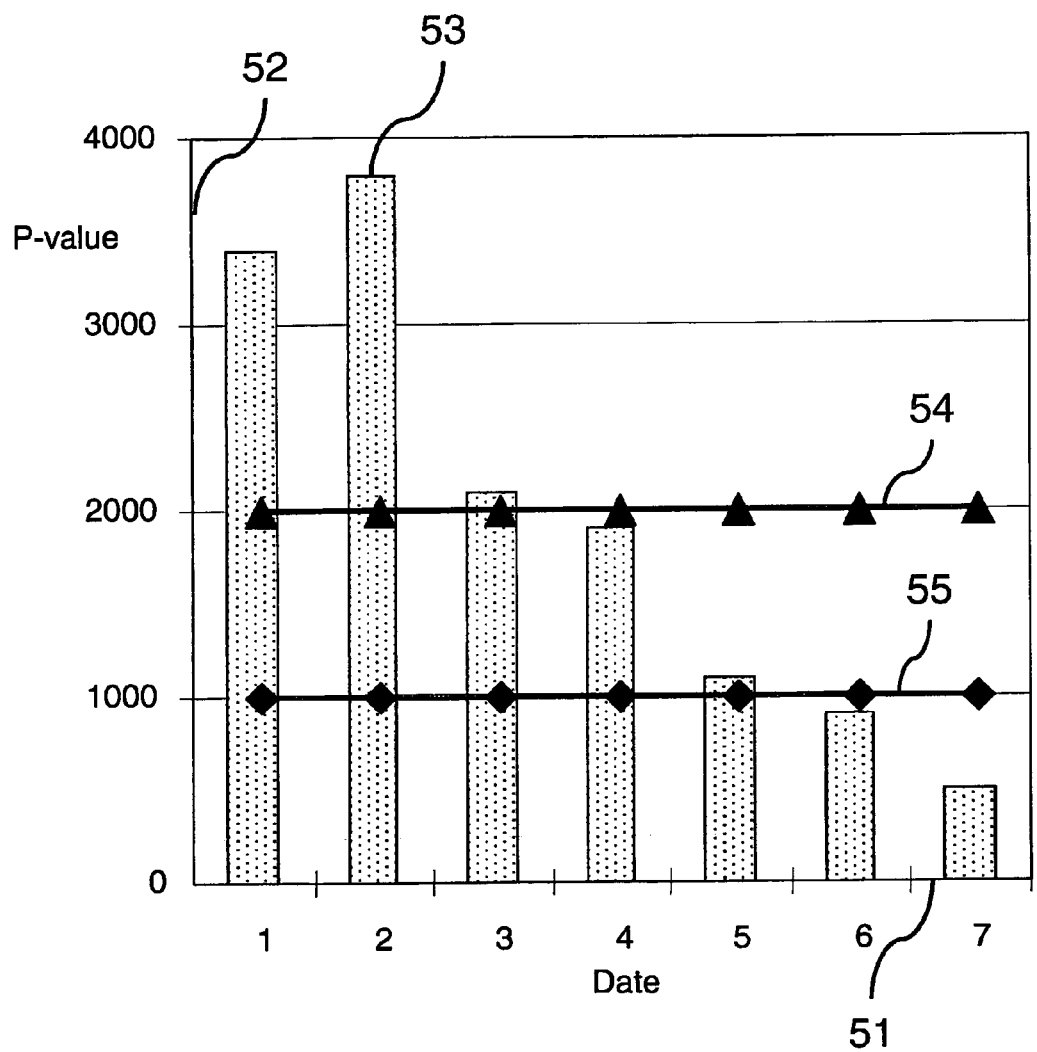
FIG. 5 shows systematic error analysis.

FIG. 5 shows exemplary aspects of the systematic error analysis. In FIG. 5 a measurement period number is indicated on a horizontal axis Date 51, and a relative performance value is indicated on a vertical axis P-value 52. The relative performance values 53 in subsequent periods are shown as bars, and are calculated for a specific error or performance indicator. For example, the specific error may be counted by an error counter, or the performance may be measured by some automatic test routine, e.g. performed daily, during start-up or as a background job. The absolute values detected are transformed to relative values by normalizing according to the operational use, e.g. the number of operating hours or the number of prints, wherein the higher values indicate better performance than lower values. A high boundary 54 indicates a minimum reference value for normal performance. A low boundary 55 indicates a lowest reference value for normal performance, indicating that a remedy is immediately required. Both boundaries are based on the knowledge of the properties of the type of the device, which are retrieved from the type database 26. In a practical example, the low boundary 55 (in the Figure at higher P-value) may represent a value where 80% of the known devices will have a better performance, and the high boundary 54 may represent a value where 90% of the known devices will have a better performance.

It is noted that the systematic error analysis may include calculating a number of values for different error parameters based on algorithms. Each algorithm may use the relevant historical data for calculating average values and normalizing such values. Subsequently the calculated values for subsequent periods are compared to earlier calculated values to generate a trend value for the performance of the actual device, i.e. compared with its own earlier performance. Also, the calculated normalized values are compared with known boundary values representative of the respective device type, i.e. to detect if the actual deviates from expected values.

In an embodiment, the systematic error analysis module 50 has a filter to prevent calculating erroneous values. The filter detects the number of operations and compares the number to a minimum number of operations. If the number is too low to assure reliable results, the calculation is aborted, or a low priority is assigned to the results. Alternatively, the period for calculation may be extended to include one or more preceding periods for including more measurement data. The minimum number of operations may be part of the type database, and may be different for different error codes.

Alternatively, a filter may be applied to remove incidental errors from the prioritized item list. A low number of errors may be acceptable or even expected for some error codes. Hence the type database may include threshold data that indicate an error level that is acceptable for specific error codes. Hence, the calculation unit sets the priority of an item in the prioritized item list, for a selected error type, in dependence on determining if the error data comprises incidents. In a particular case, errors are classified as incidents if a relatively small number of intervals that constitute the actual period contain at least one error. The intervals may correspond to fixed time intervals, like one day or one week. If a particular error occurs a number of times on one day, but most other days that error does not occur, the errors are classified as incidents.

In FIG. 5, the sample values of subsequent periods, e.g. gathered during subsequent visits, indicate a decrease in performance. The systematic error analysis calculates the following. From period 1 to period 2 a normal performance is detected.

From period 2 to period 3 a trend change is detected, however the high boundary 54 is not crossed. A detected trend provides a first priority factor called a trend indicator. Subsequently, a related item may be included in the prioritized item list, but a relatively low priority is assigned. Looking at the next visit at period 4 and comparing it with the prior visit or period 3, the trend is not detected but the high boundary is crossed, so a boundary priority indicator is activated. The boundary priority indicator has a low value if the high boundary 54 is crossed, a high value if the low boundary 55 is crossed, and is zero otherwise. Looking at the visit 5 and comparing it with the prior visit or period 4, the trend is detected and the high boundary 54 is still crossed. Looking at the visit 6 and comparing it with the prior visit or period 5 no trend is detected but the low boundary 55 has been passed. Finally, comparing period 7 with period 6, the trend is detected in combination with passing the low boundary.

The priority of the related item in the prioritized item list may be based on the combination of both the trend indicator and the boundary indicator. The priority rules are based on combining, for the selected error type, the detected trend based on the change in time compared to earlier periods, and the detected pattern based on the boundaries crossed for the actual period. If the trend is a confirmed and strong trend, and the low boundary 55 is crossed, the priority is high. However, a single incident may trigger the low boundary 55, but may not be a confirmed trend. The resulting priority may be at a medium level.

There are 5 different combinations defined. Each combination has its specific priority. Trend and no boundary 54, 55 passed: priority 2. No trend and high boundary 54 passed, priority 3. Trend and low boundary 55 passed: priority 1. No trend and low boundary 55 passed: priority 2. Trend and high boundary 54 passed: priority 1.

It is noted that the service tool 21 is an advisory tool. The user may take action on the presented items, but preferably the user also applies their own experience, e.g. some detected error codes will need immediate action and others may be very customer and device usage related. Maintenance triggers that indicate a replacement of a certain part can be ignored because the quality of the part appears still sufficient for this particular customer. Other maintenance parts must be replaced, because otherwise the device will not function. The basic prioritization is achieved by the service tool, and the prioritized list of symptoms is created based on errors and counters in the actual and/or historical data, and further based on the general rules and triggers in the knowledge data and statistic error analysis. In addition, based on the experience of the technician and the customer situation, actions are carried out on symptoms detected by the service tool.

The main advantage of the service tool lies in uniformity, one working method and one tool for all devices, by providing a prioritized, automatic and fast overview of possible symptoms based on general rules. Further advantages include the possibility to add symptoms manually, automatic links to all digital documentation, device tests and other service tools, easy reporting and finally making the information available for further analysis.

FIG. 6 shows a prioritized item list. The prioritized item list 28 contains an organized list section 62 of symptoms, and a list of corresponding actions section 63.

The symptoms and corresponding actions are organized according to priority rules. In particular, the symptoms are organized according to a level of affecting the performance of the actual device. A separate field may be provided for entering actual remedial actions or tests performed. The various values given in FIG. 6 are arbitrary sample values.

The prioritized item list 28 in FIG. 6 is organized in a number of categories. A first category ERRORS 64 has a high priority, and contains various error codes and error levels that have occurred. The presented list of errors is first of all the result list of the systematic error analysis (SEA) module 50. Certain error codes that are not detected by SEA, but are marked in the knowledge database to be presented whenever they are active, are also displayed. Furthermore, any error code of the type permanent error may always be presented. Finally the user has the possibility to search the actual data for remaining occurred error codes that have not been detected automatically and to add these error codes manually. The service technician uses his device experience, his knowledge of the customer situation and the diagnostic tools like Analysis, digital documentation and device tests to diagnose/analyze the problem and take the necessary actions.

In an embodiment, for some errors a number of errors may be displayed, while for other errors a relative level may be calculated and displayed. The priority may be indicated by the order in which the error codes are shown, and/or by an indicator or color, etc.

In the corresponding action list section 63, an analysis result may be provided, and/or a proposed remediation may be indicated.

A second category QUALITY 65 of the prioritized item list 28 includes indicators of the performance of the device, for example with respect to image quality and image registration. A corresponding (soft) button (not shown) may be provided to activate a related test on the device, whereby, for example, the device may generate copies or prints that can be used to judge the quality or registration.

A third category MAINTENANCE 66 of the prioritized item list 28 includes items related to preventive maintenance, such as replacing units that are affected by wear, cleaning parts or checking levels of consumables such as ink or toner. The corresponding actions include the respective maintenance actions, and the parts required may be listed.

A fourth category OTHER 67 of the prioritized item list 28 lists further symptoms of a special nature, such as a customer request or complaints, unexpected or undefined symptoms. For example, the device may have trouble switching on, or produce unusual noise or vibrations that cannot be identified by the user or operator, but have been noted and entered, e.g. via a user interface or via a service request.

Finally, a fifth category MODIFICATIONS 68 of the prioritized item list 28 includes upgrades and improvements as defined for the respective type of machine, taking into account the history of the actual apparatus. The corresponding action indicates the required parts and/or actions.

It is to be noted that items related to errors have the highest priority, whereas the subsequent categories have lower priorities. Nevertheless a modification may also have a high priority, e.g. if the modification relates to the safety of the device.

In an embodiment, the prioritized item list 28 is provided with link items (not shown) that correspond to the prioritized items, e.g. soft buttons in the action section 63. A button may activate a further detailed action list and/or service manual document, which elucidates the action to be performed. The link item may be executed on the local computer which provides the service tool, e.g. by opening a local document. The link item may also activate a communication with a remote server, e.g. via the Internet, to a central service database at the site of the manufacturer of the device.

In an embodiment, the prioritized item list may specify in the actions section actual parts that are needed to execute the action, e.g. replacement units or consumables for maintenance or modifications. The availability of the parts from a local supply, such as a car stock or regional service center, may be verified automatically, and the result may be presented in the action section.

In an embodiment, the system as shown in FIG. 2 includes a diagnostic module 70 for performing diagnostic procedures. The service tool 21 activates the diagnostic procedures from the diagnostic module 70 by controlling the actual device via the communication unit 20. A diagnostic procedure activates selected functions of the devices by setting the device in a predefined mode and operating the device. The results are received and analyzed according to predefined criteria. In particular, diagnostic tests may be activated via the service tool, for example by a dedicated button (not shown) in the actions section in the prioritized item list. The result of the diagnostic test may be detected automatically, or may require interpretation and input from the technician. The diagnostic module 70 may be a separate software tool, e.g. a software utility, or may be integrated in the service tool 21.

In an embodiment, the service tool is implemented to be directly operated by the customer, i.e. a member of the organization who owns or leases the machine. For example, the service tool may be implemented on an Internet website, and may access the required data in the customer's device via the Internet. The customer may be guided to perform the actions in the action list section, which may in this case be limited to actions the customer is able (or trusted) to perform, or a service call to a professional service technician may be generated automatically.

In an embodiment of the electro mechanical device, e.g. the printer/copier as shown in FIG. 1, the service tool is included in the control unit 170 of the device under test 100. The service tool may then be activated via the device's user interface. Also, the device may be provided with a connection slot 186 for a portable memory unit, such as a USB memory stick 184, in which service data, such as, e.g., the history database 22 (FIG. 2) and the service knowledge database 26 are pre-stored. Additionally, authorization data of the relevant service technician may be stored in the portable memory unit 184. The device would then check the authorization data and, if recognized, automatically give access to the embedded service tool.

The service tool may automatically be activated in reaction to insertion of the portable memory unit 184 into the slot 186. In that case, the device user interface 160, 161, may be taken over by the service tool for operation thereof by the technician. Accordingly, the prioritized item list may then be presented on the display 161 of the device. Alternatively, the prioritized item list may also be presented on paper as a printout from the printer unit 130.

Of course, a separate display or a workstation coupled to the device could also be used as a user interface for the embedded service tool.

Upon finishing the actual service and repair activities, information about the results (cf. FIG. 4, item 45) may be stored in the portable memory unit 184. Those data may later be used for updating the central service database 422.

Further, the electro mechanical device may be provided with a special user interface item, for example a blue button or a menu option, to activate the service tool, e.g. for a customer, for first-line diagnosis and repair tasks. The customer may then be guided to perform the actions in the action list section, which may in this case be limited to actions the customer is able (or trusted) to perform, or a service call to a professional service technician may be generated automatically.

Although the invention has been mainly explained by embodiments relating to copying and printing documents, it is noted that the system of the invention is suitable for any other type of electro mechanical machines. This includes e.g. machines that print on endless paper without an input tray, graphic drawing machines, or any type of product manipulating or treatment device.

Moreover, the description mainly focuses on the service tool used 'on-line' by the user directly on the device at a customer site. However, the tool may also be used in an 'off-line' situation, e.g. when preparing a service visit or in a remote setting. Data from the actual device may be available from earlier contacts, may be estimated or may be transmitted separately, e.g. via a network. The person in the off-line situation will use this tool offline for a better preparation of a remedial session or visit. For example, an experienced person may, based on his analysis of the work list items and usage of all additional tools, pass his advices, hints etc. to the service technician before the visit takes place. The service technician himself will also have the possibility to use this tool offline to prepare himself before visiting. A similar off-line version of this tool can also be used by the customer.

In an embodiment, the device is able to generate messages or warnings to the user, which are presented in the prioritized item list. Furthermore, communication from customer to machine and service organization may be made available via the service tool.

It is noted, that in this document the use of the verb 'comprise' or 'include' and their conjugations do not exclude the presence of other elements or steps than those listed and the word 'a' or 'an' preceding an element does not exclude the presence of a plurality of such elements, that any reference signs do not limit the scope of the claims, that the invention and every unit or means mentioned may be implemented by suitable hardware and/or software and that several 'means' or 'units' may be represented by the same item. Further, the scope of the invention is not limited to the embodiments, and the invention lies in each and every novel feature or combination of features described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for diagnosis of electromechanical devices of at least one predefined type, the system comprising:
    a communication unit that communicates with an actual device of the at least one predefined type;
    a unit that accesses a knowledge data set containing knowledge relating to properties of devices of the at least one predefined type;
    a unit that accesses a device data set containing parameters of the actual device, the parameters including actual error data indicating errors that occurred in an actual period;
    a unit that accesses a history data set containing historical data of the actual device, the historical data including at least one of historical error data relating to errors, performance data relating to performance analysis and remediation data relating to failure remediation that occurred before the actual period;
    a calculation unit that analyzes and combines data from at least one of the knowledge, device and history data sets for generating a prioritized item list indicative of remedial steps to be executed, the items relating to at least one of performance and failure of the actual device, and being prioritized according to priority rules; and
    a systematic error analysis unit connected to the calculation unit that systematically detects trends or patterns in the actual and historical error data,
    wherein the systematic error analysis unit is arranged for detecting at least one trend of the actual device by comparing relative error values calculated from the actual and historical error data, and the calculation unit is arranged for including a trend item in the prioritized item list when the at least one trend exceeds a predetermined threshold.

2. The system as claimed in claim 1, wherein the calculation unit is arranged for generating the prioritized item list according to the priority rules by including symptoms and corresponding actions, the symptoms being selected according to an amount of affect the symptoms have on the performance of the actual device.

3. The system as claimed in claim 1, wherein the calculation unit is arranged for generating the prioritized item list subdivided into categories according to the priority rules.

4. The system as claimed in claim 3, wherein the categories comprise at least one of an error category, a maintenance category, a modification category, and a quality category.

5. The system as claimed in claim 1, wherein the systematic error analysis unit is arranged for detecting at least one pattern of the actual device based on relative error values calculated from at least the actual error data compared to at least one reference value based on the knowledge relating to properties of devices of the at least one predefined type, and the calculation unit is arranged for including a pattern item in the prioritized item list when the at least one pattern exceeds a predetermined threshold.

6. The system as claimed in claim 1, wherein the calculation unit is arranged for setting the priority of an item in the prioritized item list according to priority rules by combining, for a selected error type, said detected at least one trend and said detected at least one pattern.

7. The system as claimed in claim 1, wherein the calculation unit is arranged for setting the priority of an item in the prioritized item list according to priority rules by adjusting the priority, for a selected error type, in dependence of a number of activities executed by the electromechanical device in the actual period.

8. The system as claimed in claim 1, wherein the calculation unit is arranged for setting the priority of an item in the prioritized item list according to priority rules by adjusting the priority, for a selected error type, in dependence on determining if the actual and historical error data comprises incidents, in a particular case by classifying errors as incidents if a relatively small number of intervals that constitute the actual period contains at least one error.

9. The system as claimed in claim 1, further comprising a diagnostic unit that performs diagnostic procedures by controlling the actual device via the communication unit.

10. The system as claimed in claim 1, wherein the calculation unit is arranged for including replacement parts in the prioritized item list related to the remedial steps.

11. The system as claimed in claim 1, wherein the calculation unit is arranged for including remedial data in the prioritized item list related to the remedial steps that have been executed.

12. The system as claimed in claim 1, wherein the unit that accesses the history data set is arranged for including the prioritized item list in the history data set.

13. A method for diagnosis of electromechanical devices of at least one predefined type, the method comprising the steps of:
    communicating with an actual device of the at least one predefined type;
    accessing a knowledge data set containing knowledge relating to properties of devices of the at least one predefined type;
    accessing a device data set containing parameters of the actual device, the parameters including actual error data indicating errors that occurred in an actual period;
    accessing a history data set containing historical data of the actual device, the historical data including at least one historical error data relating to errors, performance data relating to performance analysis and remediation data relating to failure remediation that occurred before the actual period; and
    analyzing and combining data from at least one of the knowledge, device and history data sets for generating a prioritized item list indicative of remedial steps to be executed, the items relating to at least one of performance or failure of the actual device, and being prioritized by applying priority rules,
    wherein said step of analyzing comprises systematic error analysis for systematically detecting trends or patterns in at least one of the actual and historical error data, and
    wherein the systematic error analysis comprises detecting at least one trend of the actual device by comparing relative error values calculated from the actual and historical error data, and said step of generating comprises including a trend item in the prioritized item list when the at least one trend exceeds a predetermined threshold.

14. The method as claimed in claim 13, wherein said step of generating the prioritized item list according to the priority rules comprises including symptoms and corresponding actions, the symptoms being selected according to an amount of affect the symptoms have on the performance of the actual device.

15. The method as claimed in claim 13, wherein the systematic error analysis comprises detecting at least one pattern of the actual device based on relative error values calculated from at least the actual error data compared to at least one reference value based on the knowledge relating to properties of devices of the at least one predefined type, and said step of generating comprises including a pattern item in the prioritized item list when the at least one pattern exceeds a predetermined threshold.

16. The method as claimed in claim 13, wherein said step of generating comprises setting the priority of an item in the prioritized item list according to priority rules by combining, for a selected error type, said detected at least one trend and said detected at least one pattern.

17. The method as claimed in claim 13, wherein said step of generating comprises including remedial data in the prioritized item list related to the remedial steps that have been executed.

18. The method as claimed in claim 13, wherein said step of accessing the history data set comprises including the prioritized item list in the history data set.

19. The method as claimed in claim 13, including a preliminary step of storing at least said knowledge data set containing knowledge relating to properties of devices of the at least one predefined type in a portable data storage medium for connection to the actual device.

20. The method as claimed in claim 13, wherein said step of communicating with the actual device includes connecting a portable data storage medium to the actual device, the portable data storage medium containing at least said knowledge data set containing knowledge relating to properties of devices of the at least one predefined type.

21. The method as claimed in claim 20, wherein in reaction to connection of said portable data storage medium, the actual device automatically enters a diagnosis mode wherein said steps of accessing data sets and of analyzing and combining are performed.

22. A computer program product embodied on a computer readable medium readable by a processor for diagnosis of electromechanical devices of at least one predefined type, said program product including computer executable instructions executable by the processor to perform the steps of:
communicating with an actual device of the at least one predefined type;
accessing a knowledge data set containing knowledge relating to properties of devices of the at least one predefined type;
accessing a device data set containing parameters of the actual device, the parameters including actual error data indicating errors that occurred in an actual period;
accessing a history data set containing historical data of the actual device, the historical data including at least one historical error data relating to errors, performance data relating to performance analysis and remediation data relating to failure remediation that occurred before the actual period; and
analyzing and combining data from at least one of the knowledge, device and history data sets for generating a prioritized item list indicative of remedial steps to be executed, the items relating to at least one of performance or failure of the actual device, and being prioritized by applying priority rules,
wherein said step of analyzing comprises systematic error analysis for systematically detecting trends or patterns in at least one of the actual and historical error data, and
wherein the systematic error analysis comprises detecting at least one trend of the actual device by comparing relative error values calculated from the actual and historical error data, and said step of generating comprises including a trend item in the prioritized item list when the at least one trend exceeds a predetermined threshold.

23. An electromechanical device of at least one predefined type, comprising a diagnosis system, the system comprising:
a unit that accesses a knowledge data set containing knowledge relating to properties of devices of the at least one predefined type;
a unit that accesses a device data set containing parameters of the electromechanical device, the parameters including actual error data indicating errors that occurred in an actual period;
a unit that accesses a history data set containing historical data of the electromechanical device, the historical data including at least one of historical error data relating to errors, performance data relating to performance analysis and remediation data relating to failure remediation that occurred before the actual period; and
a calculation unit that analyzes and combines data from at least one of the knowledge, device and history data sets for generating a prioritized item list indicative of remedial steps to be executed, the items relating to at least one of performance and failure of an actual device, and being prioritized by applying priority rules; and
a systematic error analysis unit connected to the calculation unit that systematically detects trends or patterns in the actual and historical error data,
wherein the systematic error analysis unit is arranged for detecting at least one trend of the electromechanical device by comparing relative error values calculated from the actual and historical error data, and the calculation unit is arranged for including a trend item in the prioritized item list when the at least one trend exceeds a predetermined threshold.

24. The device as claimed in claim 23, wherein the device is a digital sheet processing apparatus for processing sheet documents, the apparatus comprising at least one of a printer unit and a scanner unit.

25. The device as claimed in claim 24, wherein the device comprises a user interface that includes a user operable command for activating the diagnosis system.

26. The device as claimed in claim 23, wherein the device comprises an interface for a portable data storage medium including at least the knowledge data set containing knowledge relating to properties of devices of the at least one predefined type.

27. The device as claimed in claim 26, including a device that automatically senses a connection being made with a portable data storage medium having stored therein data for diagnosis of the electromechanical device, and in reaction automatically activating the diagnosis system.

28. The device as claimed in claim 26, including a device that automatically senses a connection being made with a portable data storage medium and thereupon automatically checking authorization data stored therein.

* * * * *